(12) United States Patent
Rothlisberger

(10) Patent No.: US 6,578,850 B1
(45) Date of Patent: Jun. 17, 2003

(54) DYNAMIC SEAL FOR A DRIVE SHAFT

(75) Inventor: John A. Rothlisberger, Portland, OR (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 09/712,880

(22) Filed: Nov. 14, 2000

(51) Int. Cl.$^7$ ................................................. F16J 15/40
(52) U.S. Cl. ...................... 277/423; 277/347; 277/400; 277/424; 277/500; 277/510; 277/511; 277/512; 277/520; 277/637
(58) Field of Search .................. 277/500, 510–512, 277/520, 616, 637, 347, 400, 423, 424, 433, 612, 424.3; 415/143, 174.2, 230

(56) References Cited

U.S. PATENT DOCUMENTS

| | | | | |
|---|---|---|---|---|
| 3,578,342 A | * | 5/1971 | Satterthwaite et al. | 277/511 |
| 4,533,148 A | * | 8/1985 | Lindahl | 241/101.2 |
| 4,580,790 A | * | 4/1986 | Doose | 277/937 |
| 5,078,410 A | * | 1/1992 | Warman et al. | 277/424 |
| 5,538,258 A | * | 7/1996 | Hager et al. | 277/423 |
| 5,573,253 A | * | 11/1996 | Naitou et al. | 264/29.5 |
| 5,762,275 A | * | 6/1998 | Aikawa | 241/261.2 |
| 6,039,483 A | * | 3/2000 | Szekely | 222/390 |
| 6,152,719 A | * | 11/2000 | Nelik et al. | 418/201.1 |
| 6,224,322 B1 | * | 5/2001 | Calboreanu | 277/423 |
| 6,325,387 B2 | * | 12/2001 | Shoemaker | 277/511 |

OTHER PUBLICATIONS

Excerpt from maintenance manual of The Bauer Bros. Co., revision date of Sep. 1964, publication date of the manual is unknown, 5 pgs.

Excerpt from Refiner/Mechanical Services, published by General Electric Corporation, date of the document is unknown but it is believed the GE Turbo–Rotor Air–Seal, sold by General Electric Corporation, was sold prior to Nov. 14, 2000, 4 pgs.

* cited by examiner

*Primary Examiner*—Anthony Knight
*Assistant Examiner*—Christopher Boswell
(74) *Attorney, Agent, or Firm*—Banner & Witcoff, Ltd.

(57) ABSTRACT

A dynamic seal for a drive shaft including a seal housing with at least one inlet for injecting a fluid, (i.e., a liquid or gas) into the seal. The seal also has an expeller device, such as an expeller ring mounted on the drive shaft, for expelling the injected fluid along the drive shaft in the direction of the casing. In addition, the seal may employ sealing rings positioned to prevent the injected fluid from escaping the seal in a direction other than along the shaft toward the casing, such as a glass-filled PTFE ring positioned proximal to the expeller device and a seal adjuster for compressing a graphite-yarn packing ring against the glass-filled PTFE seal ring. Further, the seal may additionally or alternately include a fitted sleeve covering the drive shaft to protect the shaft from wear and corrosion.

31 Claims, 5 Drawing Sheets

DYNAMIC SEAL FOR A DRIVE SHAFT

BACKGROUND OF THE INVENTION

The invention relates to a dynamic seal for a rotating drive shaft, such as a drive shaft used with atmospheric discharge refiners.

Atmospheric discharge disc refiners are used in both the primary and subsequent stages of processing wood chips, cooked wood pulp, sawdust/shavings, cotton, grass, and other fibrous material. Typically, these refiners have a casing enclosing at least one disc mounted on a rotating drive shaft. (More particularly, some refiners employ two discs, each mounted on its own drive shaft, while others employ a single rotating disc mounted on a drive shaft facing a stationary disc.) It is therefore necessary to seal the opening of the casing where the rotating shaft or shafts extend into the casing.

Conventionally, atmospheric discharge refiners use a "stuffing box" or "packing box" type seal for this purpose. The "stuffing box" seal typically has a shaft sleeve to prevent wear and corrosion of the drive shaft, and a housing designed to hold braided-yam packing rings of various materials in groups of two to six per set. These packing rings are contained concentrically around the sleeve and assembled into the stuffing box consecutively, usually with a "lantern ring" to distribute water or grease as a lubricant for the seal. Alternately, some atmospheric discharge refiners employ mechanical seals, such as those used in boiler feed water pumps. These mechanical seals typically have hardened seal rings that rub against carbon rings, which are cooled and lubricated by high-pressure water supplied by a dedicated booster pump system.

While both types of seals have been employed with atmospheric discharge disc refiners, neither has proved satisfactory. The packing rings of the "stuffing box" type seal must be compressed radially against the rotating shaft sleeve to prevent fiber, water, steam and other process media from escaping the casing and causing spillage and damage to the refiners' bearings. The compression device that provides this compression (e.g., a "gland-follower") must be adjusted by way of two, three or four take-up nuts and studs, or bolts. The packing compression of the packing rings must be monitored and adjusted at regular intervals for proper performance of the seal, requiring maintenance personnel's physical attention at least daily.

Further, misalignment or improper tightening of the gland follower can cause the packing rings to overheat and burn up from friction. Additionally, improper adjustments can allow leaks and spillage of the process media from the casing, contaminating the packing and causing packing ring failure and premature wear of the shaft sleeve. Still further, the assembly of the "stuffing box" type seal requires large amounts of axial shaft space, making it difficult to reach for service and adjustment. Moreover, the seal's excessive use of the space along the shaft may decrease the amount of space that can be used for feeding the fiber stock into the casing. As a result of these problems, "stuffing box" type seals are seldom maintained properly, and a large number of refiner operating failures and shortened operating cycles for refiners are caused by the use of this type of seal.

With regard to mechanical seals, these seals are typically not practical for atmospheric discharge refiners. Mechanical seals have very tight running tolerances, and cannot be axially adjusted as required for atmospheric discharge refiner applications. Further, these seals typically cannot perform well with the operating vibration levels of atmospheric discharge refiners. In addition, the costs of such mechanical seals and the adapters necessary to employ them on refiners are prohibitive, and maintenance or replacement of mechanical seals requires disassembly of the main rotating element of the refiner, leading to a loss of production and high maintenance expense.

BRIEF SUMMARY OF THE INVENTION

Accordingly, there is a need for an improved drive shaft seal for atmospheric discharge refiners. The dynamic seal according to the invention advantageously offers a drive shaft seal that can effectively and efficiently seal an atmospheric discharge refiner. The seal according to one embodiment of the invention includes a seal housing with at least one inlet for injecting a fluid (i.e., a liquid or gas) into the seal. This embodiment also employs an expeller device, for expelling the injected fluid along the drive shaft in the direction of the casing, so as to provide a dynamic seal for containing the process media or fiber stock within the casing. In particular, the seal may include an expeller ring mounted on the shaft such that the expeller ring rotates with the shaft to expel the injected fluid from the seal along the shaft toward the casing.

In addition, the seal according to various embodiments of the invention may employ seating rings positioned to prevent the injected fluid from escaping the seal in a direction other than along the shaft toward the casing. For example, some embodiments of the invention may employ a glass-filled polytetrafluoroethylene ring positioned proximal to the expeller device. Various embodiments of the invention may also employ a seal adjuster for compressing a graphite-yarn packing ring against the glass-filled polytetrafluoroethylene seal ring. Still further, the seal housing may include an internal flange to create a chamber for containing the fluid injected into the seal. Additionally, the seal may include a fitted sleeve covering the drive shaft to protect the shaft from wear and corrosion.

The dynamic seal according to the invention advantageously provides a seal that effectively and efficiently seals the entrance of the drive shaft into the casing, to prevent process media from escaping the casing. Further, the seal according to the invention is substantially smaller than conventional "stuffing box" type seals, allowing additional space for feeding the process media into the container. Also, the seal according to the invention can be easily adjusted to provide movement along the axial length of the drive shaft when the axial position of the disc is changed.

DETAILED DESCRIPTION OF THE INVENTION

Figure 1:
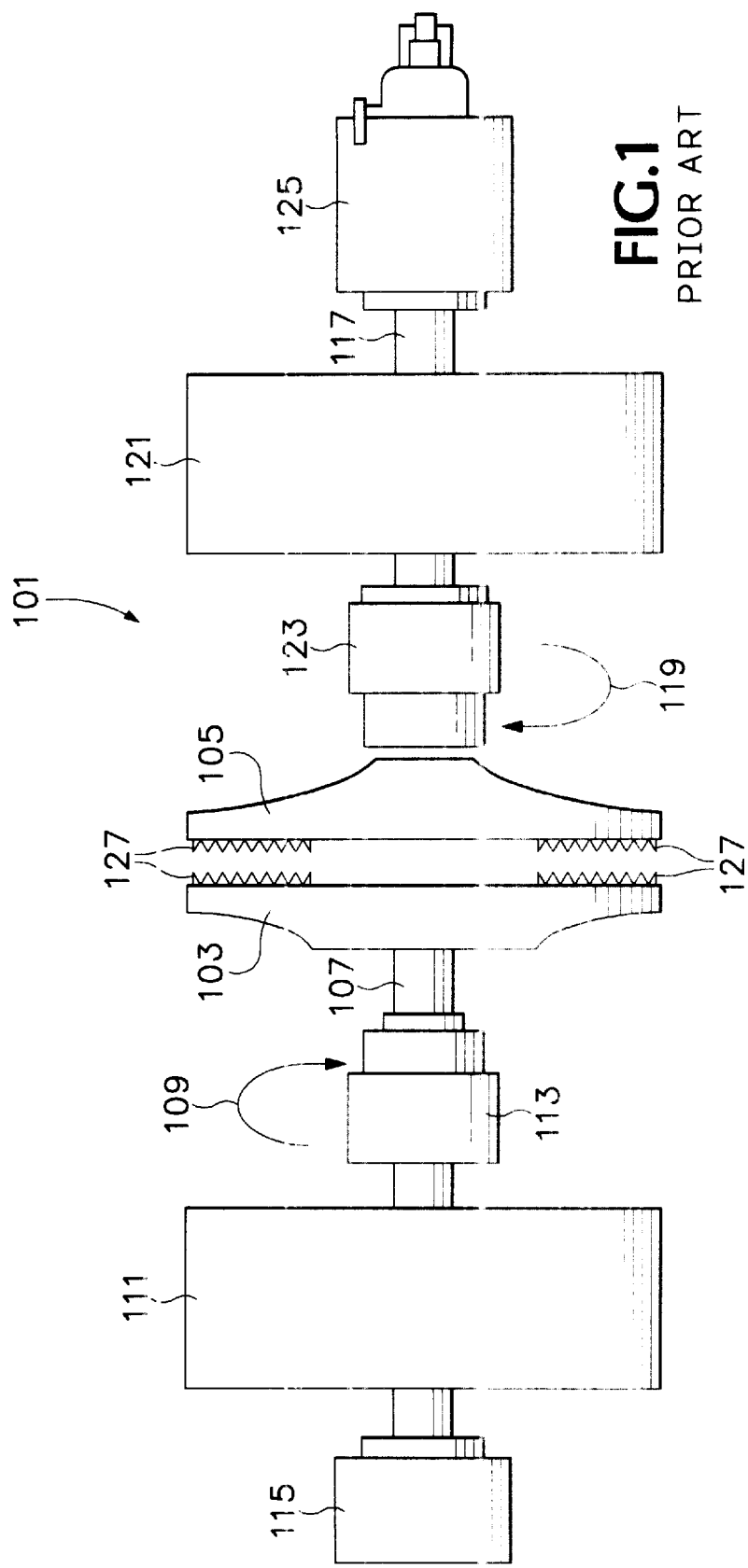
FIG. 1 schematically illustrates a conventional atmospheric discharge refiner.

FIG. 1 schematically illustrates one type of atmospheric discharge refiner 101. The refiner has a first disc 103 that faces a second disc 105. The first disc 103 is mounted on a first rotating drive shaft 107, which is driven in a first direction 109 by a first motor 111. The shaft 107 is supported by a first inboard bearing housing 113 and a first outboard bearing housing 115.

Similarly, the second disc 105 is mounted on a second rotating drive shaft 117 that is driven in a second direction 119 by a second motor 121. The drive shaft 117 is also supported by a second inboard bearing housing 123 and a second outboard bearing housing 125. A case (not shown in FIG. 1) encloses the two discs 103 and 105.

As is known in the art, fiber stock, such as wood chips, is introduced into the casing. At least one of the discs 103 and 105 is spoked or has holes across its circumference in its axial direction, so that the fiber stock moves between the two discs 103 and 105. Each of the discs 103 and 105, which rotate in opposite directions, has plates 127 on their face. As the stock passes between the rotating plates 127, rubbing, brushing, fiberizing, or cutting forces are imposed on the chips by the plates 127 or other fibers. As is known in the art, these forces are dependent on the relative speed of rotation of the two discs, relative surface speed, diameter, plate pattern, sharpness of the plates, type of stock, clearance between the plates, consistency, and other factors. These forces act to reduce the fiber stock to its basic fiber material, so that the fiber stock can subsequently be used in, for example, paper production.

The fiber stock is normally supplied through a first entrance in the casing at atmospheric pressure, and discharged through a second opening in the casing to a chest or flume at atmospheric pressure. Those of ordinary skill in the art will appreciate that various types of atmospheric discharge refiners are known in the art. For example, the type of refiner illustrated in FIG. 1 employs two oppositely facing discs that rotate in opposite directions. Other types of refiners, however, may use only a single rotating disc 103, and hold disc 105 stationary. The dynamic seal according to the invention may be used with any of these different types of refiners.

Figure 2:
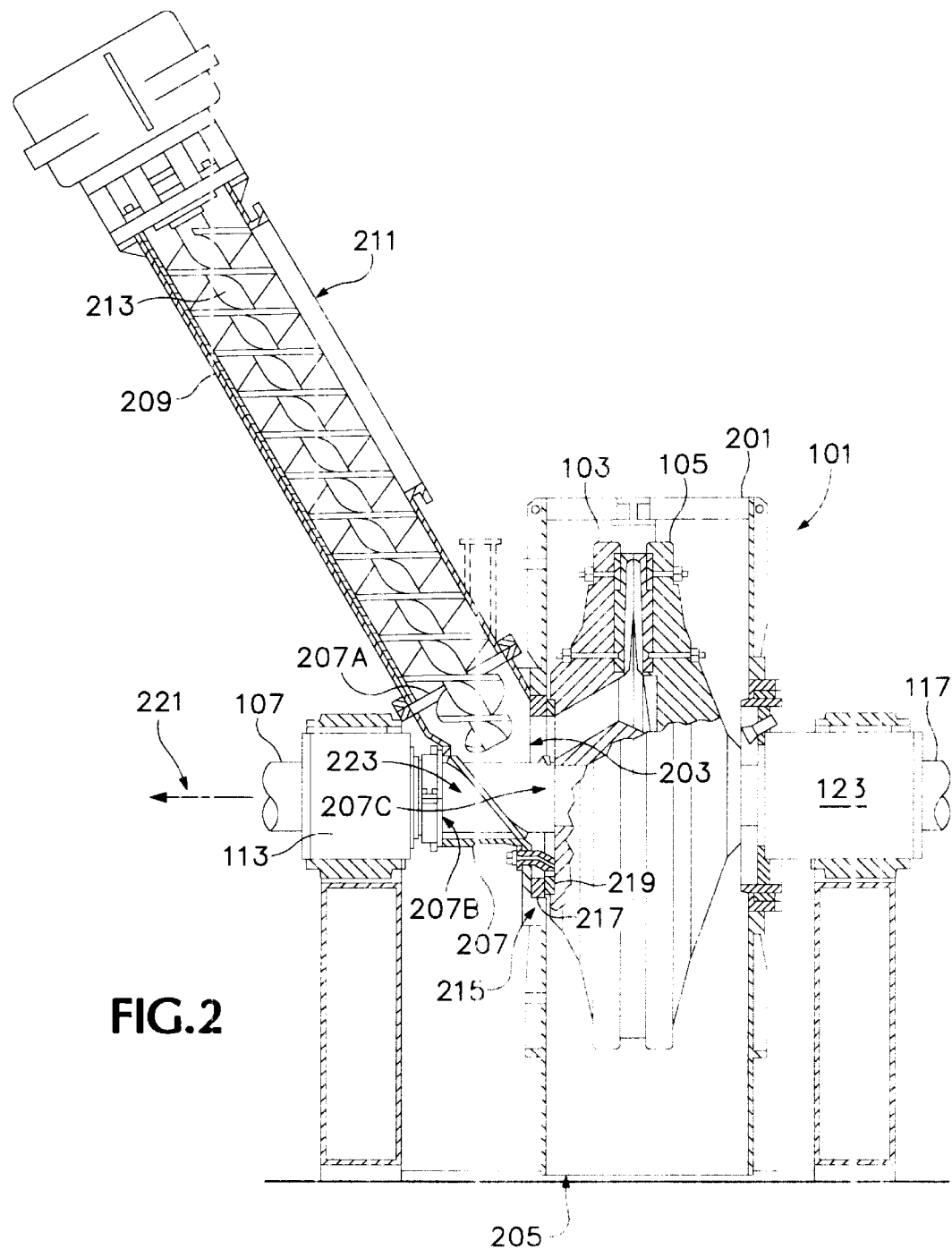
FIG. 2 illustrates an atmospheric discharge refiner according to one embodiment of the invention.

FIG. 2 illustrates an atmospheric discharge refiner according to one particular embodiment of the invention. As previously discussed, the refiner includes a disc 103 mounted on a first rotating shaft 107 supported by an inboard bearing housing 113, and a second disc 105 mounted on a second rotating shaft 117 supported by a second inboard bearing housing 123. As seen in FIG. 2, a casing 201 encloses both of the discs 103 and 105. The casing defines a first opening 203 where the fiber stock is introduced into the casing, and second opening 205 where the processed fiber stock exits the casing 201.

The fiber stock is delivered to opening 203 through an inlet spout 207 connected to a feeder housing 209. The feeder housing 209 defines an opening 211 into which fiber stock is dumped, and encloses a dual lead feed screw 213. A motor (not shown) rotates the dual lead feed screw 213 about its axis. This rotation of the dual lead feed screw 213 forces the fiber stock dumped through opening 211 along the length of the feeder housing 209 to the inlet spout 207. As seen in FIG. 2, the inlet spout 207 defines a first opening 207A where the fiber stock passes into the inlet spout 207 from the feeder housing 209. The inlet spout 207 also defines a second opening 207B through which the drive shaft 107 passes into the 207, and a third opening 207C in communication with the first opening 203 of the casing 201. Both the drive shaft 107 and the fiber stock pass from the inlet spout 207 into the casing 201 through this third opening 207C.

As may also be seen in FIG. 2, the refiner 101 provides a seal 215 between the plate 103 and the casing 201. The seal 215 is positioned around the first opening 203, to ensure that the fiber stock introduced into the casing 201 passes through the holes or between the spokes of the disc 103, rather than pushing up over or falling below the disc 103. The seal 215 includes a first grinding seal 217 mounted on the container 201, and a second grinding seal 219 mounted on the plate 103. As will be appreciated by those of ordinary skill in the art, the grinding seals 217 and 219 rub against each other during rotation of the disc 103, grinding each other down. Because of this grinding action, the plate 103 (along with the drive shaft 107, the plate 105, and the drive shaft 117) must periodically be moved along the axial direction 219 of the drive shafts 107 and 117, to maintain a good seal between grinding plates 217 and 219.

As previously noted, the inlet spout 207 introduces the fiber stock into the opening 203 of the casing 201 with the drive shaft 107. Accordingly, it is necessary to seal the shaft 107 and the opening 207B of the inlet spout 207 so that the fiber stock does not escape through the opening 207B. To this end, the invention provides a seal 223 for sealing the shaft 107 and inlet spout opening 207B. This seal 223 will now be discussed with reference to FIGS. 3 and 4.

As seen in these figures, the seal 223 includes an expeller ring 301 permanently fixed on the drive shaft 107 (or, as shown in these figures, a protective sleeve on the drive shaft 107) so that the ring 301 rotates with the drive shaft 107. In this embodiment, the expeller ring 301 is shrink-fitted to a protective sleeve on the shaft 107, which sleeve will be discussed in detail below. According to other embodiments of the invention it may alternately be permanently or temporarily adhered, clamped, welded or otherwise attached to the sleeve shaft through any convenient means known in the art, or it may be attached directly to the shaft 107 by any convenient means known in the art if a protective shaft sleeve is not employed. The expeller ring may preferably be formed from stainless steel, such as, e.g., 17-4PH SS H-900 type stainless steel, or it may be formed from any other suitable material.

The seal 223 also includes a seal housing 303. The seal housing 303 abuts and is mounted to the edges of the inlet spout 207 defining the opening 207A. With the embodiment illustrated in FIGS. 3 and 4, the seal housing 303 is removably bolted to inlet spout 207, but any suitable means for mounting the seal housing 303 to the inlet spout 207 may be employed. The illustrated seal housing 303 is formed from two housing pieces 303A and 303B that are bolted or clamped together. This allows the seal housing 303 to be easily removed for maintenance, but a seal housing 303 formed from a single piece of material or from three or more pieces of material may alternately be used. The seal housing 303 may also be formed from stainless steel, such as 316-L or 304-L stainless steel, or any other suitable material.

Figure 3:
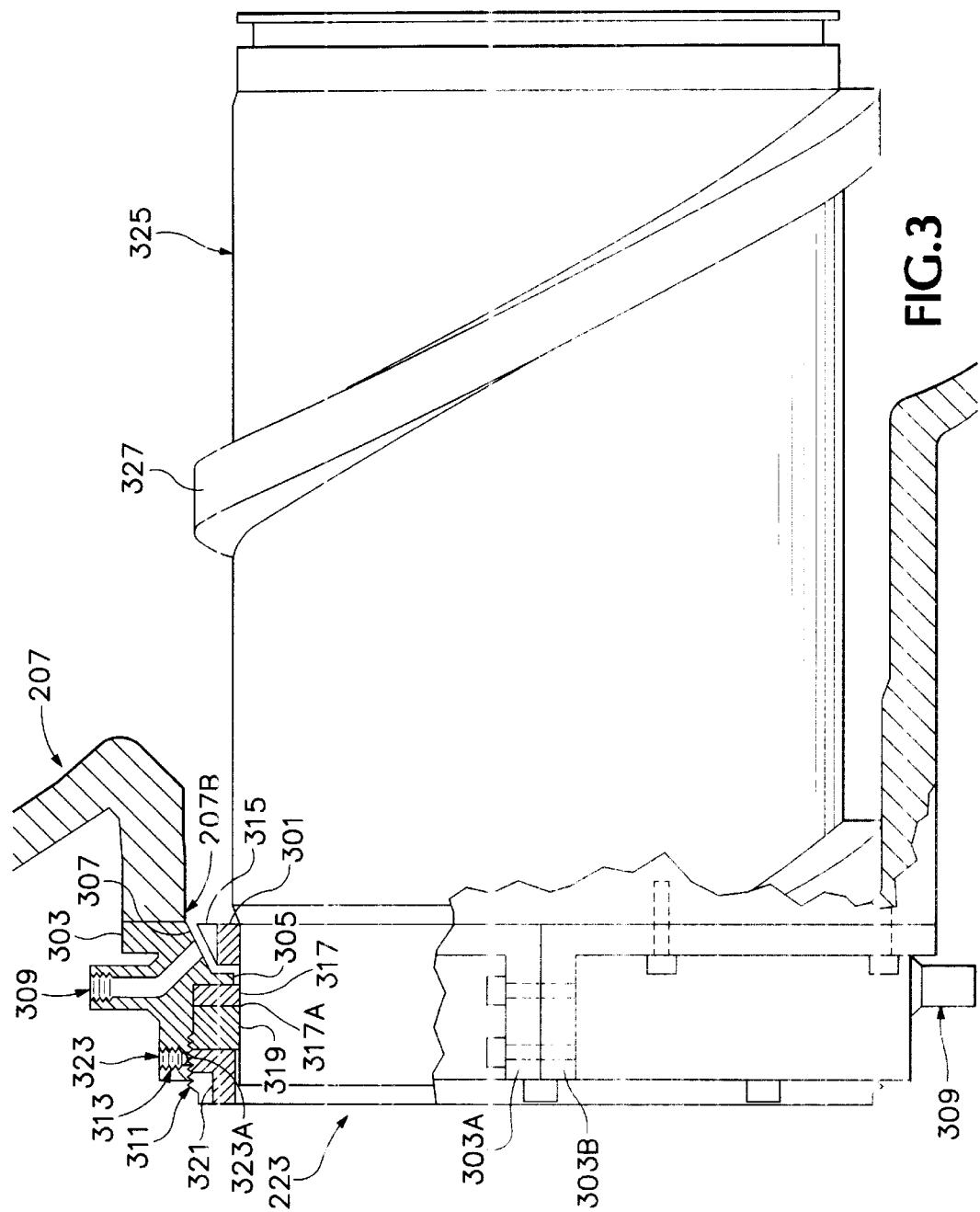
FIG. 3 shows a partial cross-sectional view of a dynamic seal for a drive shaft according to one embodiment of the invention.
Figure 4:
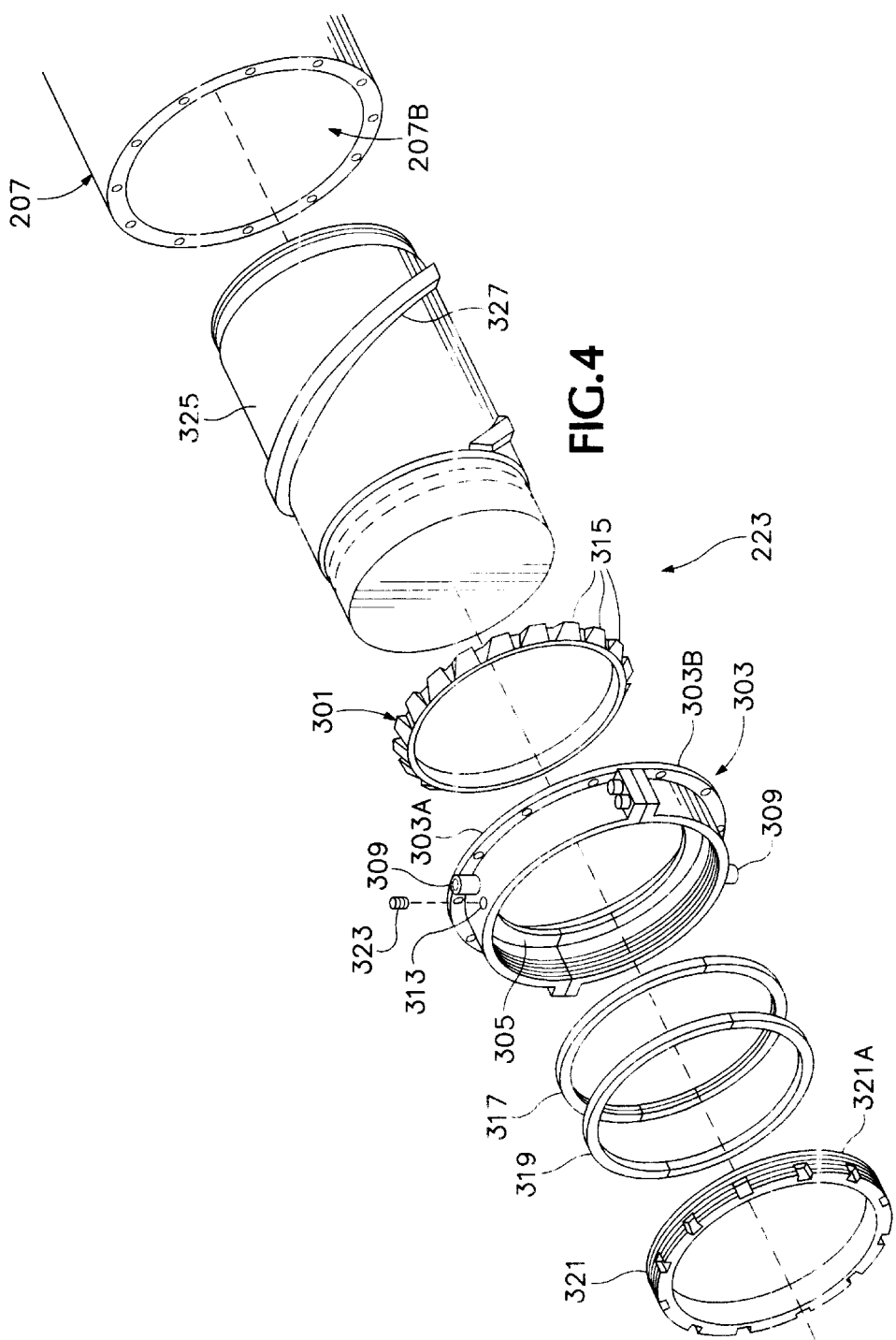
FIG. 4 shows an exploded view of the dynamic seal illustrated in FIG. 3.

The seal housing 303 includes an inner flange 305 that extends to the shaft 107 (or a protective sleeve on the drive shaft 107) along the side of the expeller ring 301 facing away from the inlet spout 207. As best seen in FIG. 3, this flange 305 thus defines a chamber 307 between the seal housing 303 and the drive shaft 107 (or a protective sleeve on the drive shaft 107) on the side of the expeller 301 facing away from the inlet spout 207. The seal housing 303 further defines two inlets 309, for introducing a fluid, such as a liquid (e.g., water) or a gas (e.g., air) into the chamber 307. The particular embodiment illustrated in FIGS. 3 and 4 show two inlets 307, but those of ordinary skill in the art will appreciate that 1, 3, 4, 5 or any other convenient number of fluid inlets 307 may be defined by the seal housing 303. In addition to the fluid inlets 309 and chamber 307, the seal housing 303 is internally threaded with a series of threads 311 facing the shaft 107 and one or more through holes 313, the purposes of which will be described in detail below.

The expeller ring 301 includes a row of pitched blades (or vanes) 315 evenly spaced about its circumference. As will be appreciated by those of ordinary skill in the art, when the expeller ring 301 rotates with the drive shaft 107, the pitched blades 315 act to expel the fluid from the chamber 307 into the inlet spout 207. As can be seen from FIG. 3, the pitched blades 315 are angled toward the shaft 107 in the direction 219. Similarly, the seal housing 303 defines the chamber 307 such that the walls of the chamber 307 angle toward the drive shaft 107 in the direction 221. This arrangement allows the drive shaft 107 and the expeller ring 301 to be moved in direction 221, in order to reposition the grinding rings 217 and 219 as previously discussed.

The operation of the seal 223 will now be explained. During the refining process, fiber stock is dumped into the feeder housing 209 through the housing opening 211, and transported to the inlet spout 207 by the dual lead screw 213. As the dual lead screw 211 pushes the fiber stock through the inlet spout 207 into the casing 201, a fluid, such as air or water, is introduced through the fluid inlets 309 to the chamber 307. As the expeller ring 301 rotates with the shaft 107, the pitched blades 315 of the expeller ring 301 expel the fluid from the chamber 307 into the inlet spout 207, creating a positive pressure away from the entrance 207B of the inlet spout 207 and toward the casing 201.

This fluid pressure pushes any fiber stock that may not have been carried into the casing 201 away from the entrance 207B of the inlet spout 207, keeping the entrance 207B free from debris. To maintain this fluid pressure at an effective level, various embodiments of the invention may preferably introduce the fluid through the inlets 307 at a pressure of 5 psi greater than the pressure within the casing 201. Those of ordinary skill in the art that will appreciate, however, that higher or lower relative pressures may be alternately used depending upon the circumstances.

In addition to the expeller ring 301 and the seal housing 303, the seal 223 may also include a seal ring 317, a packing ring 319, and a seal adjuster 321. The seal ring 317 encircles the shaft 107 (or a protective sleeve on the drive shaft 107) and is positioned against the flange 305, to form a seal that prevents fluid from escaping the chamber 307 in direction 219 The seal ring 317 may be formed from glass-filled polytetrafluoroethylene or any other suitable material that resists wear from the rotation of the shaft 107 and provides a good seal for the chamber 307. Also, in the illustrated embodiment, the seal ring 317 is fitted to the seal adjuster so that the seal ring has a 0.0005" to 0.010" radial clearance with the drive shaft 107 (or a protective sleeve on the drive shaft 107), so that the shaft 107 may rotate with the seal ring 317 remains stationary. Of course, those of ordinary skill in the art will appreciate that other embodiments may mount the seal ring 317 with greater or lesser clearance as circumstances may dictate.

The packing ring 319 similarly encircles the shaft 107 (or a protective sleeve on the drive shaft 107), and is positioned against the seal ring 317. In the illustrated embodiment, the packing ring is formed of an impregnated graphite yarn (i.e., a graphite yarn impregnated with lubricant), but it may alternately be formed of any other suitable material. The seal adjuster 321 then compresses the packing ring 319 against the seal ring 317, to form a secure seal for the chamber 307.

As may be seen in FIG. 3, the seal ring 317 has a chamfered portion 317A formed about the perimeter of the drive shaft 107 (or a protective sleeve on the drive shaft 107). Thus, when the seal adjuster 321 compresses the packing ring 319 against the seal ring 317, the packing ring 319 can advantageously expand into the chamfered area 317A to form a secure seal.

As may be seen in FIGS. 3 and 4, the outer edge 321A of the seal adjuster 321 is threaded. This allows the seal adjuster 321 to be threaded onto the threads 311 of the seal housing 303 to compress the packing ring 319 against the seal ring 317. As may be best seen in FIG. 3, once the seal adjuster 321 has been threaded to the desired position, a setscrew 323 can be inserted through the opening 313 defined in the seal housing 303 to hold the seal adjuster 321 in the desired position. As will be appreciated by those of ordinary skill in the art, the setscrew 323 may have a nylon tip 323A to avoid damaging the threads on the seal adjuster 321. Thus, the arrangement of the seal ring 317, the packing ring 319, and the seal adjuster 321 provides a secure seal for the chamber 307, preventing fluid or fiber stock from leaking out of the seal housing 303 in direction 219.

Figure 5:
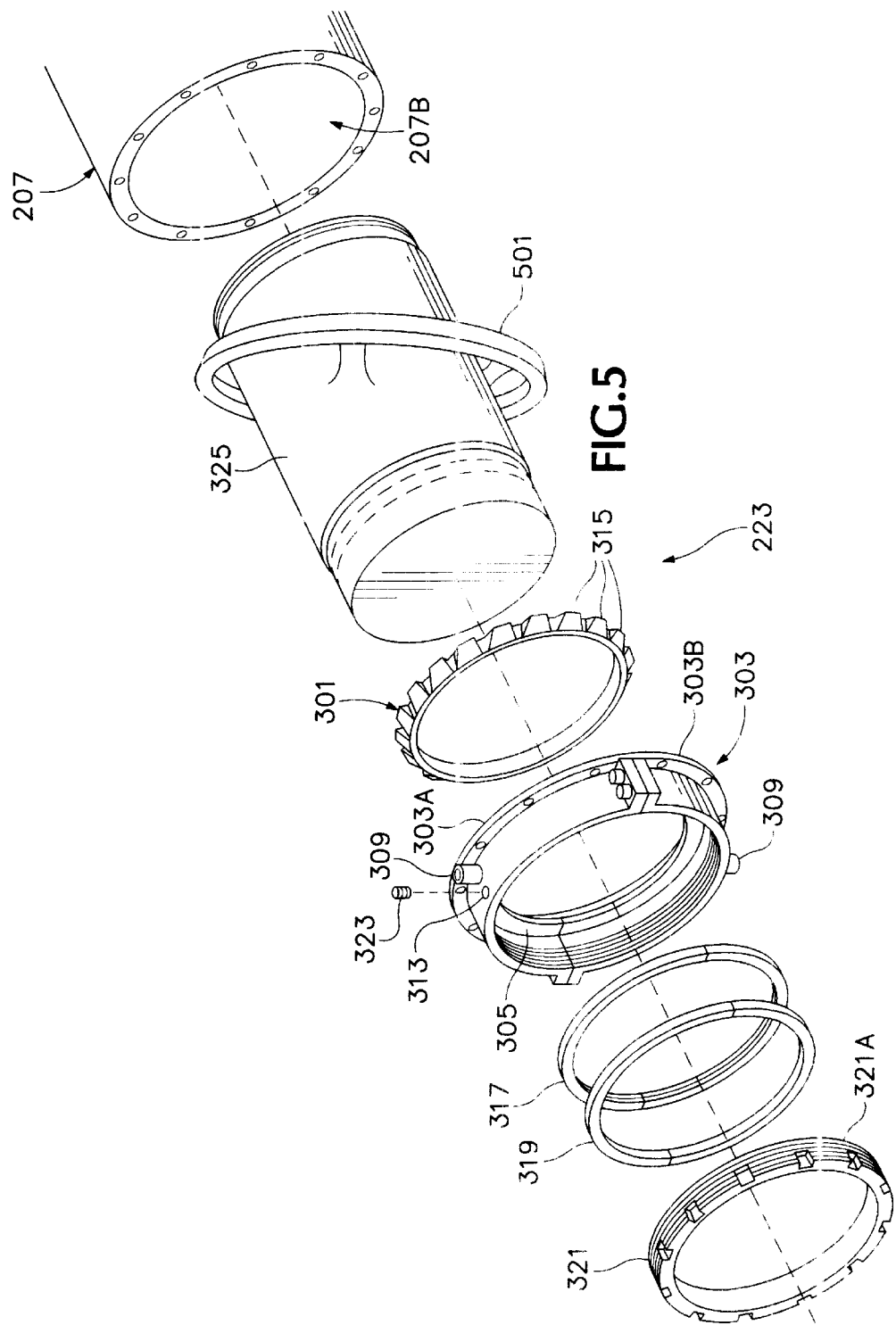
FIG. 5 shows a drive shaft sleeve according to another embodiment of the invention.

As previously noted, the seal 223 may additionally include a protective sleeve 325 encircling the drive shaft 107 to protect the shaft 107 from wear and corrosion. Further, the protective sleeve 325 may be flited to include a screw lead 327 for pushing the fiber stock from the inlet spout 207 into the casing 201. The sleeve 325 may be formed of, e.g., stainless steel, such as 316 SS NCB coated type stainless steel or any other suitable material. Other embodiments of the invention may employ a protective sleeve 325 that alternately or additionally includes other structures for pushing the fiber stock from the inlet spout into the casing 201, such as the ribbon feeder structure shown in FIG. 5.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A seal for a drive shaft, comprising:
   a seal housing encircling the drive shaft, the seal housing being configured to
      form a chamber between the seal housing and the drive shaft, and
      define a fluid inlet for introducing fluid into the chamber; and
   an expeller device for expelling fluid from the chamber.

2. The seal recited in claim 1, wherein the expeller device is an expeller ring mounted around the drive shaft.

3. The seal recited in claim 2, wherein the expeller ring includes a series of pitched blades about its circumference for expelling fluid from the chamber.

4. The seal recited in claim 3, wherein the pitched blades are angled toward the drive shaft in a direction toward the chamber.

5. The seal recited in claim 1, further including a seal ring encircling the drive shaft and positioned proximal to the chamber.

6. The seal recited in claim 5, wherein the seal ring is formed from glass-filled polytetrafluoroethylene.

7. The seal recited in claim 5, further including a packing ring compressed against the seal ring.

8. The seal recited in claim 7, wherein the packing ring is formed of graphite yarn.

9. The seal recited in claim 7, further including a seal adjuster compressing the packing ring.

10. The seal recited in claim 5, wherein the seal ring is chamfered proximal to the drive shaft.

11. The seal recited in claim 1, wherein the seal housing is formed of two pieces.

12. The seal recited in claim 1, wherein the seal housing includes a flange extending from the seal housing toward the drive shaft to form the chamber.

13. The seal recited in claim 1, wherein the seal housing is formed from stainless steel.

14. The seal recited in claim 1, wherein the seal further includes a shaft sleeve covering a portion of the drive shaft.

15. The seal recited in claim 14, wherein the shaft sleeve has a screw lead.

16. A fluid seal for expelling debris away from a chamber, the fluid seal comprising:

a seal housing encircling a drive shaft, the seal housing being configured to define
      the chamber between the seal housing and the drive shaft,
      a fluid inlet for introducing fluid into the chamber, and
      a fluid outlet separate from the fluid inlet; and an expeller device positioned to accelerate the fluid through the fluid outlet so as to expel the fluid and debris away from the fluid outlet.

17. The fluid seal recited in claim 16, wherein the expeller device is an expeller ring mounted around the drive shaft.

18. The fluid seal recited in claim 17, wherein the expeller ring includes a series of tines located on a circumference of the expeller ring.

19. The fluid seal recited in claim 18, wherein the tines are angled toward the drive shaft in a direction toward the fluid inlet.

20. The fluid seal recited in claim 16, further including a seal ring encircling the drive shaft and positioned proximal to an end of the chamber that includes the fluid inlet.

21. The fluid seal recited in claim 20, further including a packing ring compressed against the seal ring.

22. The fluid seal recited in claim 16, wherein the expeller device is located within the chamber.

23. A fluid seal for expelling debris from a chamber, the fluid seal comprising:

a seal housing encircling a drive shaft and configured to define the chamber between the seal housing and the drive shaft, the chamber including a fluid inlet for introducing fluid into the chamber and a fluid outlet for expelling fluid from the chamber; and an expeller ring mounted around the drive shaft and located within the chamber between the fluid inlet and the fluid outlet, the expeller ring including a series of tines for accelerating the fluid through the fluid outlet so as to expel debris away from the chamber.

24. The fluid seal recited in claim 23, wherein the tines are located around a circumference of the expeller ring.

25. The fluid seal recited in claim 23, wherein the tines are angled toward the drive shaft in a direction toward the fluid inlet.

26. The fluid seal recited in claim 23, further including a seal ring encircling the drive shaft and positioned proximal to an end of the chamber that includes the fluid inlet.

27. The fluid seal recited in claim 26, further including a packing ring compressed against the seal ring.

28. A method of sealing a drive shaft from debris, comprising;

providing a seal housing that encircles the drive shaft and defines a chamber with a fluid inlet and a fluid outlet;

locating an expeller ring on the drive shaft and within the chamber such that the expeller ring is positioned between the fluid inlet and the fluid outlet;

introducing fluid into the chamber through the fluid inlet; and rotating the expeller ring to accelerate the fluid through the fluid outlet so as to expel the fluid and debris away from the fluid outlet.

29. The method of claim 28, further including a step of positioning a series of tines around a circumference of the expeller ring.

30. The method of claim 29, further including a step of angling the tines toward the drive shaft and toward the fluid inlet.

31. The fluid seal recited in claim 28, further including a step of providing a seal ring that encircles the drive shaft and a packing ring that is compressed against the seal ring.

\* \* \* \* \*

UNITED STATES PATENT AND TRADEMARK OFFICE
CERTIFICATE OF CORRECTION

PATENT NO. : 6,578,850 B1
DATED : June 17, 2003
INVENTOR(S) : John A Rothlisberger It is certified that error appears in the above-identified patent and that said Letters Patent is hereby corrected as shown below:

Column 1,
Line 23, "braided-yam" has been replaced with -- braided-yarn --;

Column 2,
Line 26, "seating" has been replaced with -- sealing --;

Column 5,
Line 47, -- . -- has been inserted after "219";

Column 6,
Line 61, "and" has been deleted;
Line 61, after "chamber;" insert the following paragraph:
-- a fluid flowing into the chamber through the fluid inlet, the fluid having a pressure greater than a pressure within the chamber; and
an expeller device for expelling the fluid from the chamber in a direction running along the drive shaft. --;

Column 7,
Line 28, "away" has been removed;
Lines 34-38, has been removed and replaced with the following:
-- a fluid inlet into the chamber, and
a separate fluid outlet; and
an expeller device located to expel the fluid through the fluid outlet in a direction running along the drive shaft. --;

Column 8,
Lines 9-10, "for expelling fluid from the chamber;" has been removed;
Lines 15-16, has been removed and replaced with the following:
-- tines for expelling the fluid from the chamber through the fluid outlet in a direction running along the drive shaft. --;

UNITED STATES PATENT AND TRADEMARK OFFICE
CERTIFICATE OF CORRECTION

PATENT NO. : 6,578,850 B1
DATED : June 17, 2003
INVENTOR(S) : John A Rothlisberger It is certified that error appears in the above-identified patent and that said Letters Patent is hereby corrected as shown below:

<u>Column 8 (cont'd),</u>
Lines 34-38, has been removed and replaced with the following:
-- introducing a fluid into the chamber through the fluid inlet such that the fluid has a pressure greater than a pressure outside of the fluid outlet; and
rotating the expeller ring to accelerate the fluid toward the fluid outlet and expel the fluid from the fluid outlet in a direction along the drive shaft, so as to thereby push the debris away from the chamber. --.

Signed and Sealed this

Fourth Day of November, 2003

JAMES E. ROGAN
*Director of the United States Patent and Trademark Office*